United States Patent
Bohm et al.

[11] Patent Number: 5,900,537
[45] Date of Patent: May 4, 1999

[54] TEST GAS LEAKAGE DETECTOR

[75] Inventors: Thomas Bohm; Rudi Widt, both of Cologne, Germany

[73] Assignee: Leybold Aktiengesellschaft, Germany

[21] Appl. No.: 08/875,370

[22] PCT Filed: Dec. 21, 1995

[86] PCT No.: PCT/EP95/05079

§ 371 Date: Jul. 3, 1997

§ 102(e) Date: Jul. 3, 1997

[87] PCT Pub. No.: WO96/24828

PCT Pub. Date: Aug. 15, 1996

[30] Foreign Application Priority Data

Feb. 9, 1995 [DE] Germany ............... 195 04 278

[51] Int. Cl.[6] ................................................ G01M 3/04
[52] U.S. Cl. ................................................... 73/40.7
[58] Field of Search ................................ 73/40, 40.7

[56] References Cited

U.S. PATENT DOCUMENTS 3,699,779 10/1972 Schlichtig ............................ 62/324
4,779,449 10/1988 Bley et al. ........................... 73/40.7
4,893,497 1/1990 Danielson .
5,547,338 8/1996 Conrad et al. ........................ 415/90

FOREIGN PATENT DOCUMENTS 0033945 8/1981 European Pat. Off. .
0534824 3/1993 European Pat. Off. .
0534825 3/1993 European Pat. Off. .
3124205 12/1982 Germany .

Primary Examiner—Hezron Williams
Assistant Examiner—Jay L. Politzer
Attorney, Agent, or Firm—Wall Marjama Bilinski & Burr

[57] ABSTRACT

A test gas leakage detection assembly (1) includes an inlet (2), a detector (3) in the form of a mass spectrometer, a first friction pump stage (5) which is driven in counter-flow, a second friction pump stage (7). The assembly further includes an intermediate connection (6) between the first and second friction pump stages, a pre-vacuum pump (8), a first connection line (13) which can be shut off between the leakage detector inlet (2) and the inlet side (9) of the pre-vacuum pump (8), and a second connection line (15) which can be shut off between the leakage detector inlet (2) and the intermediate connection (6). In order to detect leaks without using oil, the pre-vacuum pump (8) is a diaphragm pump. In order to shorten the response time, it is advantageous if the conductance of the second connection line (15) between the inlet (2) of the leakage detection assembly (1) and the intermediate inlet (6) is adjustable.

5 Claims, 1 Drawing Sheet

TEST GAS LEAKAGE DETECTOR

BACKGROUND OF THE INVENTION

The invention concerns a test gas leakage detection assembly.

A test gas leakage detection assembly having certain characteristics is known from DE-A-31 24 205. In a test gas leakage detector of that kind it is possible to perform a leakage detection process in two stages. As long as the pressure within the inlet area is still relatively high, the valve in the line leading to the intermediate connection remains closed. The gas mixture sucked in by the pre-vacuum pump arrives at the pre-vacuum side of the second stage of the friction pump. If there is test gas (helium, for example) already present in this gas owing to a relatively large leakage, it will then pass in a counter-flow through both stages of the friction pump into the detector and it is recorded. If the test sample does not have a large leakage, the valve in the line leading to the intermediate connection may be opened, so that the leakage detection process may be performed at a higher sensitivity.

In the described test gas leakage detector according to the state-of-the-art, the pre-vacuum pump is an oil-sealed pump so that there exists the danger of oil vapours entering the test sample connected at the inlet of the test gas leakage detector or the test chamber.

SUMMARY OF THE INVENTION

It is the initial task of the present invention to design a test gas leakage detector of the here affected kind in such a manner that oil-free leakage detection will be possible.

This task is solved through the present invention in that the pre-evacuation pump is designed as a diaphragm vacuum pump. Diaphragm vacuum pumps are capable of generating an entirely oil-free vacuum. The danger of oil vapours from the pre-vacuum pump entering into the inlet area of the leakage detector no longer exists.

Friction vacuum pumps can only be operated at a pre-vacuum pressure, the upper limit of which amounts to several mbar (5, for example). Diaphragm vacuum pumps have an ultimate pressure which also falls within this order of magnitude. Operation of a friction vacuum pump with a diaphragm vacuum pump as the pre-vacuum pump thus requires that the diaphragm vacuum pump be operated close to its ultimate pressure. However, as the pressure approaches the ultimate pressure, the pumping speed of a diaphragm vacuum pump approaches Zero. Since the response time of a test gas leakage detector of the here affected kind depends significantly on the pumping speed of the pre-vacuum pump, the response time will be very long when using diaphragm vacuum pumps as pre-vacuum pumps.

Furthermore it is the task of the present invention to reduce the response time of a test gas leakage detector of the presented kind equipped with a diaphragm vacuum pump as the pre-vacuum pump.

This task is solved through the present invention in that the connecting line between the inlet of the test gas leakage detector and the intermediate connection is controllable with respect to its conductance. The conductance of the connecting line must be controlled in such a manner that it is as high as possible; however, that pressure between the two friction pumps must not be exceeded which is required to maintain the operating pressure in the mass spectrometric detector. Thus there exists the possibility to link the inlet of the test gas leakage detector very early via the throttled connecting line to the intermediate connection, even when at that point of time the pressure at the inlet of the test gas leakage detector is still higher than the maximum permissible pressure between the two friction pump stages. The significant advantage of this scheme is that, compared to the diaphragm vacuum pump, the much higher pumping speed of the second friction pump stage is available very early which results in a significantly shortened response time.

BRIEF DESCRIPTION OF THE DRAWINGS

Further advantages and details of the present invention shall be explained through drawing FIGS. 1 and 2. Shown in FIG. 1 is a design example of the test gas leakage detector according to the present invention.

DETAILED DESCRIPTION OF THE INVENTION

Figure 1:
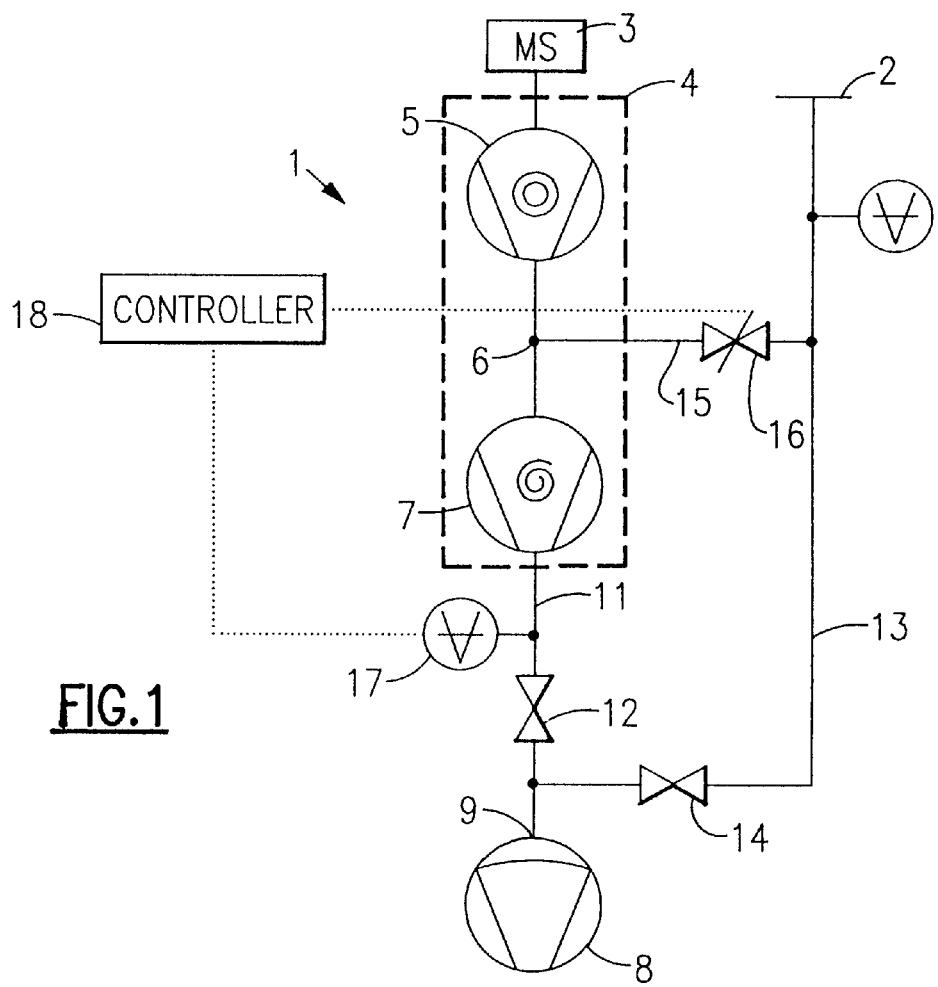

In the diagram according to FIG. 1 the leakage detector assembly is generally designated[1] as 1, its inlet as 2, the test gas detector which is of the mass spectrometric kind as 3, the dual-stage friction pump as 4, the first friction pump stage designed as a turbomolecular pump as 5, the intermediate connection as 6, the second friction vacuum pump stage being of the scroll type as 7 and the diaphragm vacuum pump which is employed as a pre-vacuum pump as 8. The discharge side of the second friction pump stage 7 is linked to the inlet side 9 of the diaphragm pump 8, specifically via line 11 with valve 12. The inlet 2 of the test gas leakage detector 1 is linked via connecting line 13 with valve 14 to the inlet side 9 of the diaphragm pump 8. Moreover, the connection between the inlet 2 of the test gas leakage detector 1 and the intermediate connection can be provided via line 15 using the valve 16.

[1] Translator's note: In the German sentence the word „bezeichnet" (designated) is missing at the end. The presence of this word has been assumed for the translation.

Pressure gauge 17 is provided for monitoring the pressure in the area of the inlet side 9 of the diaphragm pump 8. It supplies its signals to a controller (block 18). This in turn is linked to the valve 16.

In order to perform a leakage detection process, a test sample, for example, is connected to the inlet 2 of the test gas leakage detector assembly 1. Said test sample is pre-evacuated via line 13 with valves 12 and 16 closed. At a sufficiently low pressure (approximately 5 mbar), the leakage detection process commences by opening valve 12. If there is a relatively large leakage in the test sample, the test gas enters the pre-vacuum side of the friction pump 4 and from there it passes in a counter-flow to detector 3. In this case the leakage detection process is ended.

If at that time no test gas is recorded, evacuation of the test sample is continued via the line 13. In a leakage detector according to the state-of-the-art the evacuation process needs to be continued until the pressure at the inlet area corresponds to the pressure at the intermediate connection 6. Only then may valve 16 be opened to begin the high-sensitivity leakage detection phase. Since in the presented example the pre-vacuum pump is a diaphragm pump, it would take a considerable length of time before it would be possible to commence the more sensitive leakage detection process because of the diminishing pumping speed. In addition the response time of the test gas leakage detector—the time between the test gas entering into inlet 2 and the recording of it in the detector 3—is still very lengthy while valve 16 is closed.

Since the conductance of the valve 16 is adjustable, there exists the possibility of opening the link between inlet 2 and the intermediate connection 6 already at a point of time at which the inlet pressure is still higher than the necessary pressure at the intermediate connection 6. The conductance in the connecting line needs to be controlled in such a manner that the valve 16 maintains the required pressure difference in each case. At decreasing pressure at inlet 2 the conductance of valve 16 increases. It is fully open when the inlet pressure corresponds to the pressure at intermediate connection 6.

Preferably the control arrangement described is implemented automatically depending on the pressure at intermediate inlet 6 or—as implemented in the design example—and depending on the pre-vacuum pressure, measured by the pressure gauge 17. This gauge supplies its signals to the controller 18, which controls the conductance of the valve 16 depending on the desired pressure conditions.

Figure 2:
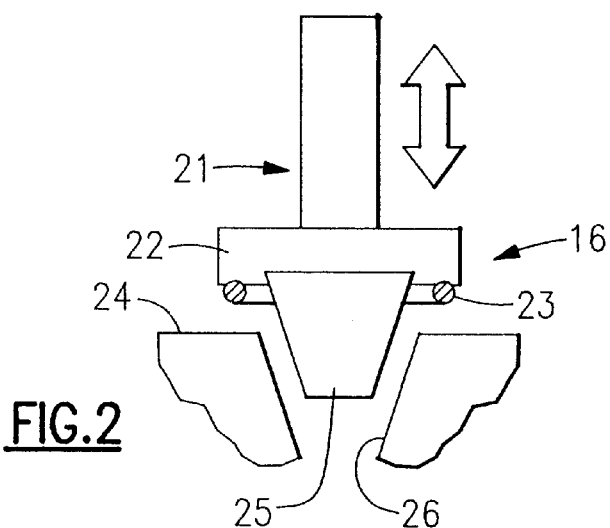
FIG. 2 is a design example for a valve, the conductance of which is adjustable.

Shown in FIG. 2 is a design example for the controllable valve 16. An adjustable plunger 21 comprises valve disk 22 with an O-ring 23. When the O-ring 23 rests against the seat 24, valve 16 is closed. The valve disk 22 is equipped with a cone 25, which depending on the position of the plunger 21 is engaged more or less in the conically designed valve opening 26 which matches shape of the cone 25. The size of the free annular slot between cone 25 and the opening 26 is thus variable. Instead of the described controllable valve 16 the use of two or more valves with orifices or other conductance limiting facilities is alternately possible. Thus a switch-over is effected from the inlet pressure successively from one valve to the next having the greater conductance in each case.

We claim:

1. A method for operating a test gas leakage detector assembly, said detector assembly comprising:

an assembly inlet;

a detector in the form of a mass spectrometer;

a dual-stage high vacuum friction pump having first and second friction pump stages, each said stage having an inlet and an outlet in which said first friction pump stage is driven in counterflow, wherein the inlet of said first friction pump stage is connected to said mass spectrometer and the outlet of said first friction pump stage is connected to the inlet of said second friction pump stage via an intermediate connection;

a pre-vacuum pump in the form of a diaphragm pump having an inlet side connected to the outlet of said second friction pump stage;

a first closeable connection line between the assembly inlet and the inlet side of said diaphragm pump; and a second connection line between the assembly inlet and the intermediate connection, the method including the steps of:

controlling the conductance of said second connection line depending on the pre-vacuum pressure on the inlet side of the pre-vacuum pressure on the inlet side of the pre-vacuum pump and the pressure between the first and second friction pump stages such that a pressure is maintained between the pump stages which is as high as possible while allowing an operating vacuum in the detector.

2. A test gas leakage detector assembly comprising:

an assembly inlet;

a detector in the form of a mass spectrometer, a dual stage high vacuum friction pump having connected first and second friction pump stages, each pump stage having an inlet and an outlet and in which said first friction pump stage is driven in counterflow, wherein the inlet of said first friction pump stage is connected to the mass spectrometer and the outlet of said first friction pump stage is connected to the inlet of said second friction pump stage via an intermediate connection;

a pre-vacuum pump in the form of a diaphragm pump having an inlet side connected to the outlet of said second friction pump stage;

a first closeable connection line between the assembly inlet and the inlet side of said diaphragm pump; and a second connection line between the assembly inlet and the intermediate connection; wherein the second connection line is controllable with respect to its conductance for improving the response time of said detector assembly.

3. A test gas leakage detector assembly according to claim 2, including a valve, which is adjustable with respect to its conductance, said at least one valve being incorporated into the second connecting line.

4. A test gas leakage detector assembly according to claim 3, wherein said adjustable valve includes a plunger carrying a cone for engaging a corresponding valve opening.

5. A test gas leakage detector assembly according to claim 2, including several valves disposed in said second connecting line for controlling the conductance.

* * * * *